(12) United States Patent
Kim et al.

(10) Patent No.: US 10,527,212 B2
(45) Date of Patent: Jan. 7, 2020

(54) HYDRAULIC TUBE CONNECTOR FOR VEHICLE

(71) Applicants: Hyundai Motor Company, Seoul (KR); Kia Motors Corporation, Seoul (KR)

(72) Inventors: Eun Sik Kim, Gwangmyeong-si (KR); Hyung Tae Choi, Asan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 165 days.

(21) Appl. No.: 15/602,504

(22) Filed: May 23, 2017

(65) Prior Publication Data
US 2018/0180206 A1 Jun. 28, 2018

(30) Foreign Application Priority Data
Dec. 27, 2016 (KR) .................. 10-2016-0179963

(51) Int. Cl.
*F16L 37/02* (2006.01)
*F16L 37/098* (2006.01)
*F16L 37/088* (2006.01)

(52) U.S. Cl.
CPC ............. *F16L 37/02* (2013.01); *F16L 37/088* (2013.01); *F16L 37/0987* (2013.01)

(58) Field of Classification Search
CPC ... F16L 37/025; F16L 37/098; F16L 37/0985; F16L 37/0987
USPC .......................................................... 285/305
See application file for complete search history.

(56) References Cited

U.S. PATENT DOCUMENTS

| | | | | |
|---|---|---|---|---|
| 2,429,782 A | * | 10/1947 | Versoy ................. | F16L 37/025 285/304 |
| 4,440,425 A | * | 4/1984 | Pate ..................... | F16L 3/1236 285/149.1 |
| 4,915,421 A | * | 4/1990 | Dennany, Jr. ....... | F16L 37/0987 285/319 |
| 5,112,086 A | * | 5/1992 | Gruber ................ | F16L 25/0045 285/315 |
| 5,193,857 A | * | 3/1993 | Kitamura .............. | F16L 37/098 285/319 |
| 5,303,963 A | * | 4/1994 | McNaughton ........... | F16L 5/06 285/140.1 |
| 5,782,508 A | * | 7/1998 | Bartholomew ..... | F16L 37/0987 285/308 |

(Continued)

FOREIGN PATENT DOCUMENTS

DE 102014107655 A1 * 12/2015 .......... F16L 37/0985
EP 0 995 938 A2 8/1999
(Continued)

*Primary Examiner* — David Bochna
(74) *Attorney, Agent, or Firm* — Morgan, Lewis & Bockius LLP

(57) ABSTRACT

A hydraulic tube connector for a vehicle may include a connector body including a first through-hole into which a tube having a tube protrusion protruding outward is inserted and a sealing O-ring groove which is formed at one side of the first through-hole, a sealing O-ring configured to be coupled to the sealing O-ring groove, and a release sleeve coupled to the connector body to prevent the sealing O-ring from being separated from the sealing O-ring groove.

9 Claims, 8 Drawing Sheets

(56) References Cited

U.S. PATENT DOCUMENTS

| | | | | |
|---|---|---|---|---|
| 6,279,966 B1* | 8/2001 | Kondo | ............... | F16L 37/0987 |
| | | | | 285/148.19 |
| 7,488,005 B2* | 2/2009 | Gunderson | ......... | F16L 37/0987 |
| | | | | 285/305 |
| 7,722,086 B2* | 5/2010 | Ishiki | ............... | F16L 37/0987 |
| | | | | 285/319 |
| 8,113,548 B2* | 2/2012 | Gunderson | ......... | F16L 37/0987 |
| | | | | 138/89 |
| 8,167,339 B2* | 5/2012 | Yagisawa | ............ | F16L 37/0987 |
| | | | | 285/305 |
| 8,220,837 B2* | 7/2012 | Kaneda | ............... | F16L 37/0987 |
| | | | | 285/319 |
| 8,720,952 B2* | 5/2014 | Matsunaga | ......... | F16L 37/0987 |
| | | | | 285/319 |
| 8,939,470 B2* | 1/2015 | Gunderson | ......... | F16L 37/0987 |
| | | | | 285/319 |
| 2003/0132631 A1* | 7/2003 | Nagata | ............... | F16L 37/0987 |
| | | | | 285/319 |
| 2004/0232693 A1* | 11/2004 | Legeay | ............... | F16L 37/098 |
| | | | | 285/305 |
| 2006/0202475 A1* | 9/2006 | Gunderson | ......... | F16L 37/0987 |
| | | | | 285/305 |
| 2007/0052232 A1* | 3/2007 | Gunderson | ......... | F16L 37/0987 |
| | | | | 285/319 |

FOREIGN PATENT DOCUMENTS

| | | | | |
|---|---|---|---|---|
| EP | 2228582 A1 * | 9/2010 | ............ | F16L 37/098 |
| KR | 10-1092708 B1 | 12/2011 | | |

* cited by examiner

HYDRAULIC TUBE CONNECTOR FOR VEHICLE

CROSS-REFERENCE(S) TO RELATED APPLICATIONS

The present application claims priority to Korean Patent Application No. 10-2016-0179963, filed on Dec. 27, 2016, the entire contents of which is incorporated herein for all purposes by this reference.

BACKGROUND OF THE INVENTION

Field of the Invention

The present invention included herein relate to a hydraulic tube connector for a vehicle, and to a hydraulic tube connector for a vehicle having improved assemblability.

Description of Related Art

Generally, in a clutch system using hydraulic pressure, a hydraulic tube which transfers hydraulic pressure from a clutch master cylinder to a release cylinder may be used.

A connector may be disposed to connect the hydraulic tube to the clutch master cylinder. The connector connects the hydraulic tube to the clutch master cylinder while preventing oil leakage.

Conventional connectors are made of steel which increases the manufacturing cost and weight thereof. In addition, connectors made of steel are required to be precisely machined, which in turn decreases productivity.

Unlike the above-described steel connector, connectors made of a plastic material include a plurality of slots. The slots move away from each other outwardly, to be forcibly inserted around the hydraulic tube. However, in such interference fitting process the connector may be permanently deformed, generating a gap between the hydraulic tube and the connector which may cause oil leakage. In addition, when a hydraulic tube is subjected to plating and coating, the plating and coating may peel off in the interference fitting which may increase the possibility of corrosion. The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic tube connector for a vehicle having improved assemblability.

Various aspects of the present invention are directed to providing a hydraulic tube connector for a vehicle in which corrosion resistance is improved since the coating of the hydraulic tube is not peeled off when the connector and the hydraulic tube are assembled.

aspects of the present invention are directed to providing a hydraulic tube connector for a vehicle having improved performance for preventing oil leakage.

Various aspects of the present invention are directed to providing a hydraulic tube connector for a vehicle in which a mold for manufacturing the connector is simplified and costs for the mold are reduced.

Various aspects of the present invention are directed to providing a hydraulic tube connector for a vehicle in which the structure of the connector is simple and the production cost is reduced.

Various aspects of the present invention are directed to providing a hydraulic tube connector for a vehicle having an improved coupling force with a hydraulic tube.

In accordance with an aspect of the present invention, a hydraulic tube connector for a vehicle includes a connector body, a sealing O-ring, and a release sleeve. The connector body includes a first through-hole into which a tube having a tube protrusion extending outward is inserted and a sealing O-ring groove which is formed at one side of the first through-hole. The sealing O-ring is configured to be coupled to the sealing O-ring groove. The release sleeve is coupled to the connector body to prevent the sealing O-ring from being separated from the sealing O-ring groove.

The sealing O-ring may include a second through-hole into which the tube is inserted and a tube protrusion groove which is configured to be coupled to the tube protrusion.

The sealing O-ring may further include a step protrusion inserted into the sealing O-ring groove to prevent the oil flowing between the tube and the first through-hole from leaking to the outside of the connector body.

The connector body may further include a plurality of coupling holes distanced from each other in a circumferential direction of the connector body.

The release sleeve may further include a push protrusion configured to press the tube protrusion wherein the tube protrusion comes into close contact with the tube protrusion groove.

The push protrusion may be engaged with one of the plurality of coupling holes wherein the release sleeve is coupled to the connector body.

The release sleeve may further include a press protrusion extending in an axial direction of the release sleeve, and the press protrusion is configured to press the sealing O-ring wherein the sealing O-ring comes into close contact with the sealing O-ring groove.

The release sleeve may further include a coupling protrusion extending outward of the press protrusion, and the coupling protrusion is engaged with one of the plurality of coupling holes wherein the release sleeve is coupled to the connector body.

The release sleeve may further include a flange configured to make contact with a rear surface of the connector body to prevent the release sleeve from moving forward of the connector body.

The release sleeve may further include a third through-hole into which the tube is inserted, and the first through-hole, the second through-hole and the third through-hole are disposed coaxially with each other.

The connector body may further include an O-ring groove formed along an external circumferential surface of the connector body to be coupled to the O-ring.

The connector body may further include a plurality of grip portions protruding radially outward of the connector body.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
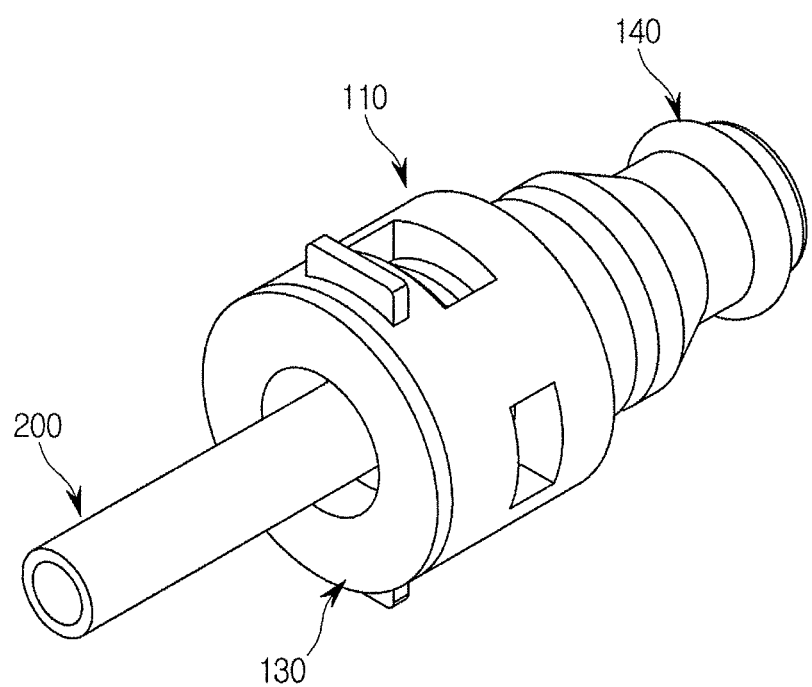
FIG. 1 is a view illustrating a state in which a hydraulic tube connector for a vehicle according to an exemplary embodiment of the present invention is coupled with a tube.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Also, the terms used in the present specification are for describing embodiments and not for limiting or restricting the present invention. It is to be understood that the singular forms "a," "an," and "the" include plural referents unless the context clearly dictates otherwise. It will be understood that when the terms "includes," "comprises," "including," and/or "comprising," when used in the present specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present invention. As used herein, the term "and/or" includes any and all combinations of one or more of associated listed items.

In the following description, a vehicle includes various machines that transport humans, goods, or animals from a departure point to a destination. For example, the vehicle may be an automobile to travel on roads or rails, a ship to travel by sea or river, or a plane to fly in the sky using the action of air.

Also, a vehicle traveling on roads or rails may move in a predetermined direction by rotation of at least one rotating wheel. The vehicle may include a three- or four-wheeled vehicle, construction machinery, a two-wheeled vehicle, a prime mover bicycle, a bicycle, and a train travelling along rails.

A hydraulic tube connector according to an exemplary embodiment of the present invention may be combined with various parts in a hydraulic system. For example, the connector may be coupled to one end portion of a tube that transfers hydraulic pressure from a clutch pedal to a transmission so that the connector is combined with the clutch master cylinder (CMC). In addition, the connector may be combined with a concentric slave cylinder (CSC), a clutch release cylinder (CRC) or the like.

Further, a tube provided to be coupled with the hydraulic tube connector according to an exemplary embodiment of the present invention may include a tube protrusion extending outwardly therefrom.

Hereinafter, exemplary embodiments according to an exemplary embodiment of the present invention will be described in detail with reference to the accompanying drawings.

Figure 2:
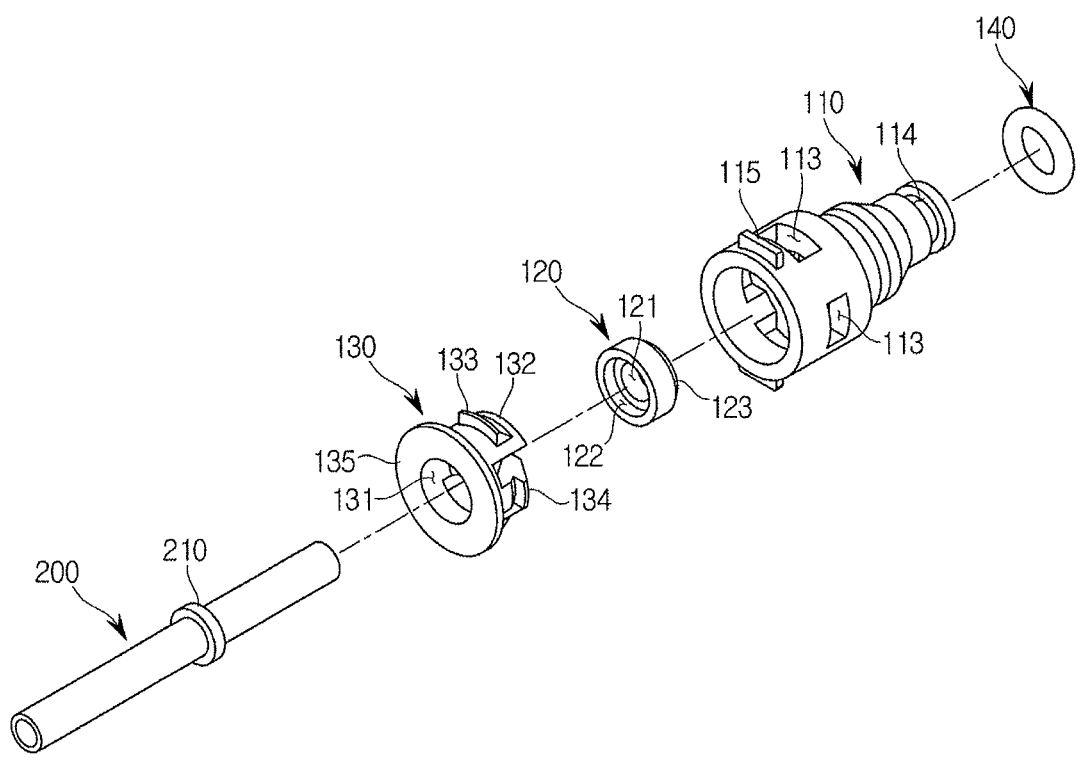
FIG. 2 is an exploded view illustrating the hydraulic tube connector and the tube shown in FIG. 1.
Figure 3:
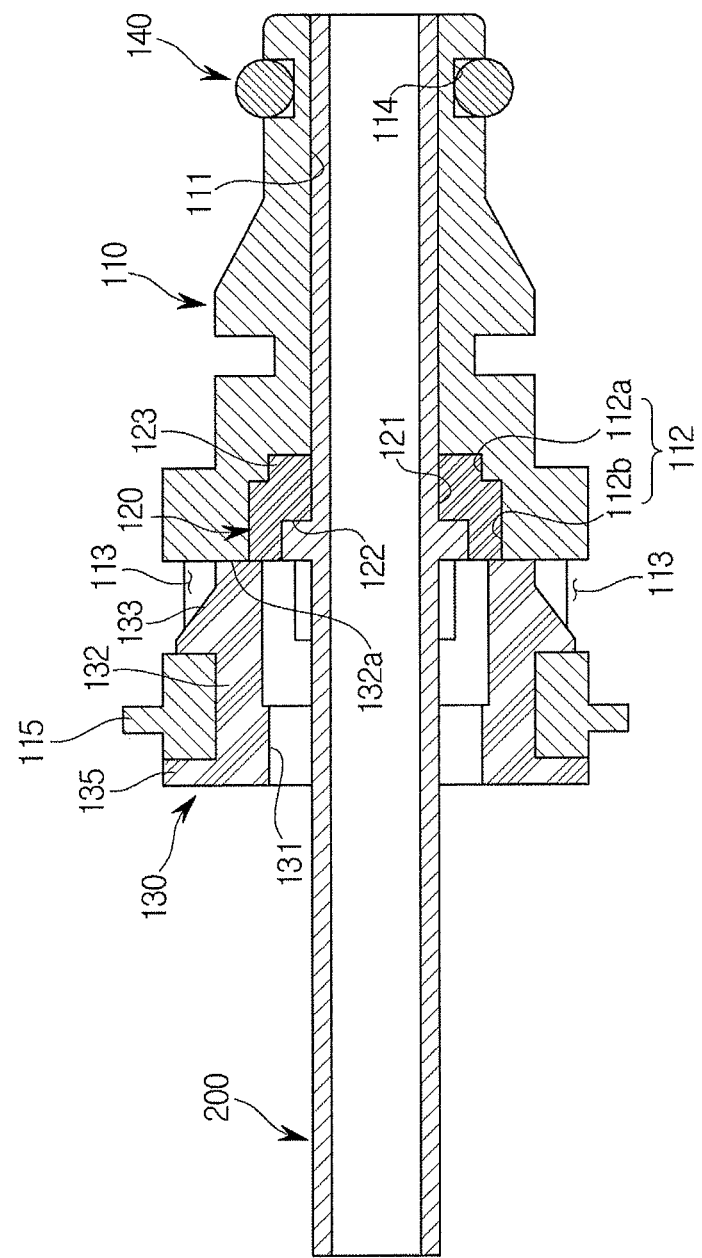
FIG. 3 is a cross-sectional view illustrating the hydraulic tube connector and the tube shown in FIG. 1.
Figure 4:
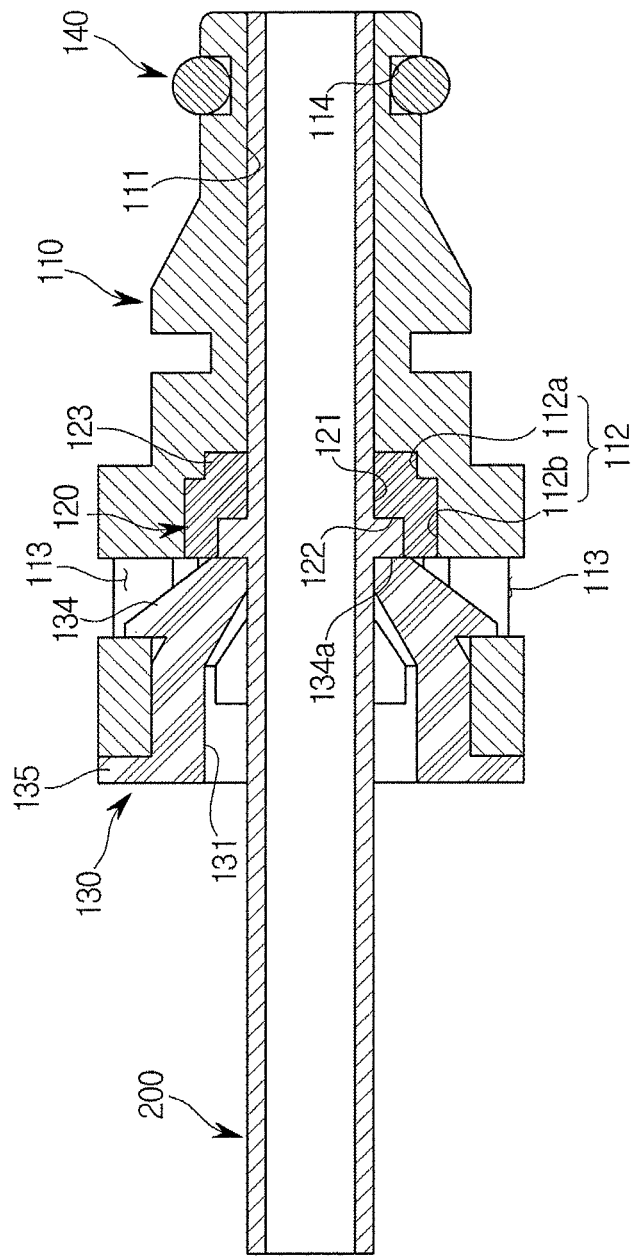
FIG. 4 is a cross-sectional view illustrating the hydraulic tube connector and the tube shown in FIG. 1 when viewed from an angle different from that of FIG. 3.
Figure 5:
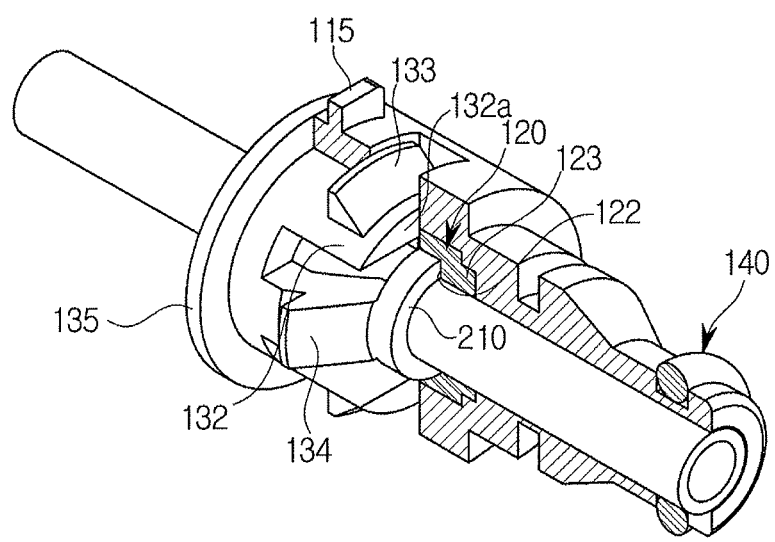
FIG. 5 is a partially-cut perspective view illustrating the hydraulic tube connector and the tube shown in FIG. 1.
Figure 6:
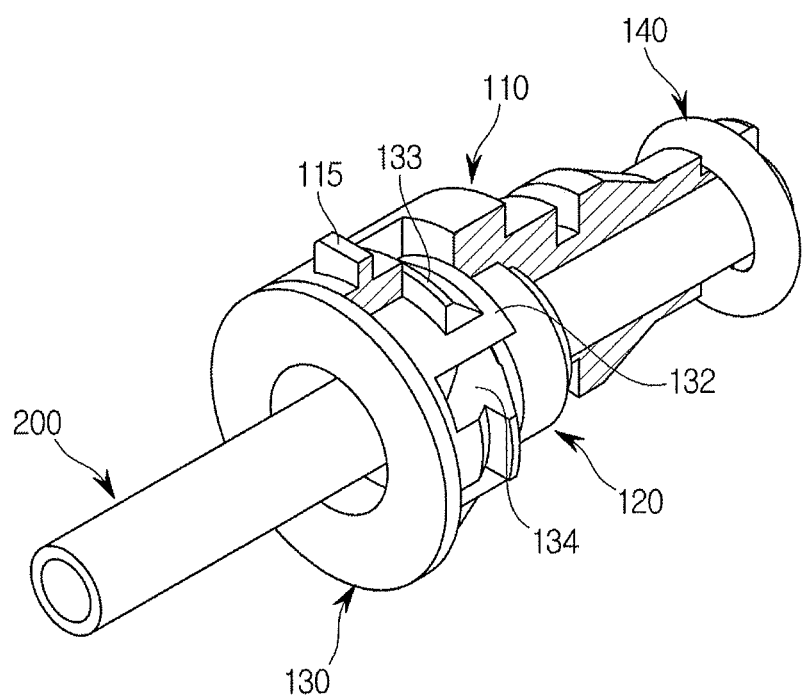
FIG. 6 is a partially-cut perspective view illustrating the hydraulic tube connector and the tube shown in FIG. 1 when viewed from an angle different from that of FIG. 5.
Figure 7:
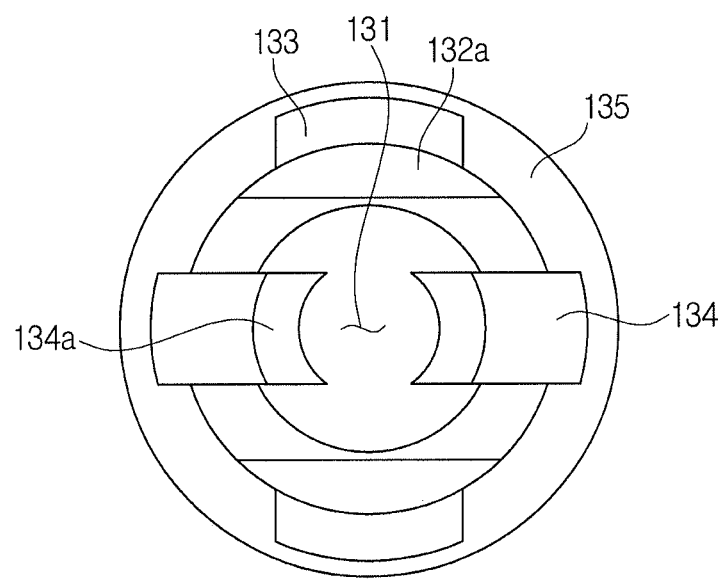
FIG. 7 is a view illustrating a release sleeve in a hydraulic tube connector for a vehicle according to an exemplary embodiment of the present invention.
Figure 8:
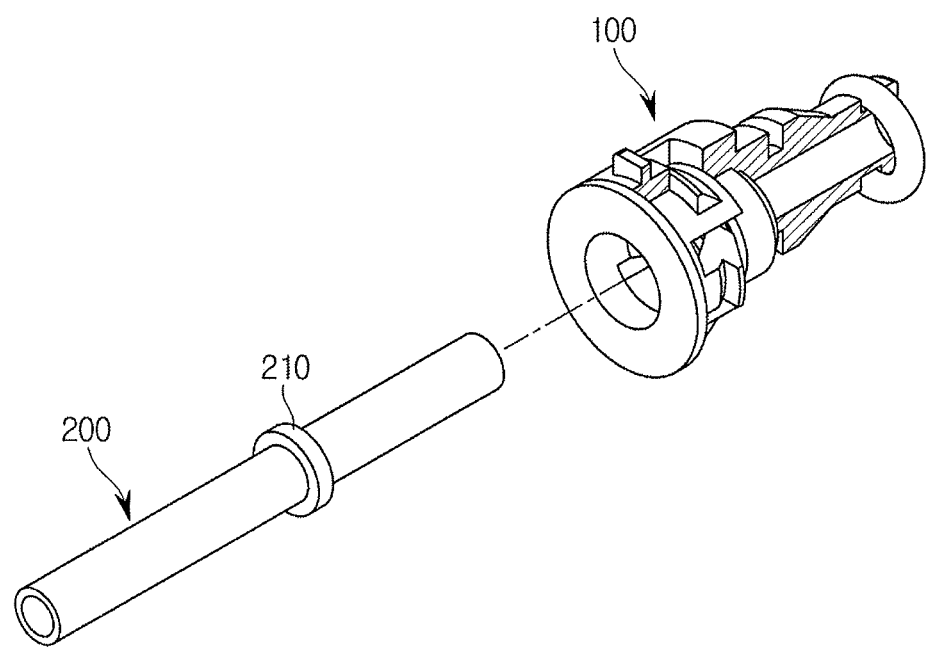
FIG. 8 is a view illustrating a hydraulic tube connector for a vehicle according to an exemplary embodiment of the present invention before the hydraulic tube connector is coupled to a tube.

FIG. 1 is a view illustrating a state in which a hydraulic tube connector for a vehicle according to an exemplary embodiment of the present invention is coupled with a tube, FIG. 2 is an exploded view illustrating the hydraulic tube connector and the tube shown in FIG. 1, FIG. 3 is a cross-sectional view illustrating the hydraulic tube connector and the tube shown in FIG. 1, FIG. 4 is a cross-sectional view illustrating the hydraulic tube connector and the tube shown in FIG. 1 when viewed from an angle different from that of FIG. 3, FIG. 5 is a partially-cut perspective view illustrating the hydraulic tube connector and the tube shown in FIG. 1, FIG. 6 is a partially-cut perspective view illustrating the hydraulic tube connector and the tube shown in FIG. 1 when viewed from an angle different from that of FIG. 5, FIG. 7 is a view illustrating a release sleeve in a hydraulic tube connector for a vehicle according to an exemplary embodiment of the present invention, and FIG. 8 is a view illustrating a hydraulic tube connector for a vehicle according to an exemplary embodiment of the present invention before the hydraulic tube connector is coupled to a tube.

The hydraulic tube connector 100 includes a connector body 110, a sealing O-ring 120, and a release sleeve 130.

The sealing O-ring 120 and the release sleeve 130 are coupled to the connector body 110. A tube 200, including a tube protrusion 210, is coupled to the connector body 110.

The connector body 110 includes a first through-hole 111. The first through-hole 111 allows the tube 200 to be inserted thereinto. At least one portion of the tube 200 is inserted into the first through-hole 111 wherein the tube protrusion 210 may not be inserted into the first through-hole 111. That is, the first through-hole 111 may have an internal diameter which is larger than an external diameter of the one portion of the tube 200 and smaller than an external diameter of the tube protrusion 210.

The connector body 110 includes a sealing O-ring groove 112 provided at one side of the first through-hole 111. The sealing O-ring groove 112 may be connected to the first through-hole 111. The sealing O-ring groove 112 may have an internal diameter larger than the internal diameter of the first through-hole 111. The sealing O-ring 120 is inserted into and coupled to the sealing O-ring groove 112.

The sealing O-ring groove 112 includes a small-diameter portion 112a and a large-diameter portion 112b. The small-diameter portion 112a has a diameter smaller than a diameter of the large-diameter portion 112b. A step protrusion 123 of the sealing O-ring 120 is inserted into the small-diameter portion 112a. The sealing O-ring 120 is inserted into the large-diameter portion 112b.

The connector body 110 includes a coupling hole 113. The coupling hole 113 may be disposed in a plurality thereof. The plurality of coupling holes 113 may be distanced from each other in a circumferential direction of the connector body 110. According to the present embodiment, the plurality of coupling holes 113 may be disposed as four coupling holes. However, the present case is only an example and the number of the coupling holes 113 may be changed.

A coupling protrusion 133 is engaged with one of the coupling holes 113. Further, a push protrusion 134 is engaged with another one of the coupling holes 113. Details will be described later.

The connector body 110 may further include an O-ring groove 114. The O-ring groove 114 is formed to be recessed inward along an external circumferential surface of the connector body 110. The O-ring 140 is fitted into the O-ring groove 114.

The sealing O-ring 120 is provided to be coupled to the sealing O-ring groove 112. The sealing O-ring 120 may be inserted into the sealing O-ring groove 112 and coupled therewith.

The sealing O-ring 120 includes a second through-hole 121 into which the tube 200 is inserted. The second through-hole 121 and the first through-hole 111 are disposed coaxially with each other.

As shown in FIG. 3 and FIG. 4, the second through-hole 121 may have the same diameter as the diameter of the first through-hole 111. However, the present invention is not limited to the present case, and the second through-hole 121 may have a diameter smaller than a diameter of the first through-hole 111.

The sealing O-ring 120 includes a tube protrusion groove 122 into which the tube protrusion 210 is inserted. The tube protrusion groove 122 is disposed at one side of the second through-hole 121.

The sealing O-ring 120 includes the step protrusion 123. The step protrusion 123 is inserted into the small-diameter portion 112a of the sealing O-ring groove 112. The step protrusion 123 may prevent the oil flowing between the tube 200 and the first through-hole 111 from leaking to the outside of the connector body 110. When the second through-hole 121 has a diameter smaller than the diameter of the first through-hole 111, the gap between the tube 200 and the sealing O-ring 120 is reduced and thus the oil flowing between the tube 200 and the first through-hole 111 may be more effectively prevented from leaking to the outside of the connector body 110 through the sealing O-ring 120. The second through-hole 121 has the same diameter as the external diameter of the tube 200 to prevent the tube 200 from being deformed.

The release sleeve 130 is coupled to the connector body 110 to prevent the sealing O-ring 120 from be separated from the sealing O-ring groove 112.

The release sleeve 130 includes a flange 135 provided in a form of a flat ring. A third through-hole 131 is formed at the center of the flange 135 wherein the tube 200 and the tube protrusion 210 pass through the third through-hole 131.

The center of the third through-hole 131 may be aligned with the centers of the first through-hole 111 and the second through-hole 121. Since the third through-hole 131 is disposed to allow the tube protrusion 210 to pass therethrough, the third through-hole 131 may have an internal diameter larger than the internal diameters of the first through-hole 111 and the second through-hole 121. The flange 135 may make contact with the connector body 110 to prevent the release sleeve 130 from moving in a coupling direction.

The release sleeve 130 includes a press protrusion 132 that protrudes from the flange 135 in an axial direction. The axial direction may indicate an axial direction of the third through-hole 131.

The press protrusion 132 may be disposed in a plurality thereof. Referring to FIG. 3, the press protrusions 132 may be provided as two press protrusions 132. The two press protrusions 132 are disposed to face each other. However, the present invention is not limited to the specific embodiment. The release sleeve 130 may include three or more press protrusions disposed to face away from each other. That is, the three or more press protrusions may be disposed to be distanced from each other in a circumferential direction of the flange 135.

The release sleeve 130 includes the coupling protrusion 133 extending outward of the press protrusion 132. The coupling protrusion 133 is engaged with the coupling hole 113.

When the coupling protrusion 133 is engaged with the coupling hole 113, the release sleeve 130 is coupled to the connector body 110. The press protrusion 132 may press the sealing O-ring 120 wherein the sealing O-ring 120 comes into close contact with the sealing O-ring groove 112. A pressing surface 132a of the press protrusion 132 may apply a force to the sealing O-ring 120 wherein the sealing O-ring 120 comes into close contact with the sealing O-ring groove 112. Thus, the sealing O-ring 120 is not separated from the sealing O-ring groove 112. In addition, the sealing O-ring 120 and the sealing O-ring groove 112 are brought into close contact with each other to diminish any gap generated therebetween.

Meanwhile, according to another exemplary embodiment of the present invention, the press protrusion 132 may not make contact with the sealing O-ring 120. At the present time, the sealing O-ring 120 and the tube protrusion 210 may be pressed only by the push protrusion 134, which will be described later. However, according to the present embodiment, the press protrusion 132 presses the sealing O-ring 120 in cooperation with the push protrusion 134, improving the coupling force between the sealing O-ring 120 and the connector body 110.

The release sleeve 130 includes the push protrusion 134. The push protrusion 134 protrudes axially from the flange 135. The push protrusion 134 may be disposed in a plurality thereof. Referring to FIG. 4, the push protrusions 134 may be provided as two push protrusions 134 disposed to face each other. However, the invention is not limited to the present exemplary embodiment. The release sleeve 130 may include three or more push protrusions, and the three or more push protrusions may be disposed to face away from each other. That is, the three or more push protrusions may be disposed to be distanced from each other in the circumferential direction of the flange 135.

The push protrusion 134 may press the tube protrusion 210 wherein the tube protrusion 210 comes into close contact with the tube protrusion groove 122. Alternatively, the push protrusion 134 may press the sealing O-ring 120 in cooperation with the tube protrusion 210 so that the sealing O-ring 120 comes into close contact with the sealing O-ring groove 112.

Referring to FIG. 4, the push protrusion 134 is engaged with the coupling hole 113. As a result, the coupling force between the release sleeve 130 and the connector body 110 may be improved.

According to another exemplary embodiment of the present invention, which is not shown in the drawings, the coupling protrusion 133 may be engaged with the coupling hole 113, and the press protrusion 132 may not make contact with the sealing O-ring 120. The push protrusion 134 may press the tube protrusion 210 and the sealing O-ring 120 without being engaged with the coupling hole 113. That is, the release sleeve 130 may be coupled to the connector body 110 through the coupling protrusion 133 and may press the tube protrusion 210 and the sealing O-ring 120 in the coupling direction through the push protrusion 134.

Hereinafter, a method for coupling the hydraulic tube connector 100 according to an exemplary embodiment of the present invention with the tube 200 will be described in detail.

As shown in FIG. 8, the hydraulic tube connector 100 may be assembled before being coupled to the tube 200. That is, after the sealing O-ring 120, the release sleeve 130, and the O-ring 140 are coupled to the connector body 110, the tube 200 may be coupled to the connector body 110. However, the O-ring 140 may be fitted to the connector body 110 after the tube 200 is coupled to the connector body 110.

The sealing O-ring groove 112 may be provided to correspond to the sealing O-ring 120 so that the sealing O-ring 120 may be inserted into the sealing O-ring groove 112 naturally.

In contrast, when the release sleeve 130 is coupled to the connector body 110 an external force is required. The connector body 110 is disposed at one side thereof with a hole into which the release sleeve 130 is inserted. For the coupling protrusion 133 to pass through the hole, the press protrusion 132 needs to be elastically deformed. Similarly, for the push protrusion 134 to pass through the hole, the push protrusion 134 needs to be elastically deformed. When the release sleeve 130 is coupled to the connector body 110, the user may apply an external force to the release sleeve 130 to elastically deform the press protrusion 132 and the push protrusion 134. Since the coupling protrusion 133 and the push protrusion 134 include inclined surfaces to pass through the hole, the user may couple the release sleeve 130 to the connector body 110 by applying a predetermined force to the release sleeve 130. A grip portion 115 may be disposed on the external of the connector body 110 to improve assemblability. The user may grip the grip portion 115 and couple the release sleeve 130 to the connector body 110.

Through the above process, the sealing O-ring 120 and the release sleeve 130 may be coupled to the connector body 110. The tube 200 may be coupled to the connector 100 that has been previously assembled.

The user needs to apply an external force to the connector 100 or the tube 200 when coupling the tube 200 to the connector 100 or when coupling the connector 100 to the tube 200.

Specifically, as shown in FIG. 4, since the tube protrusion 210 has an external diameter larger than a distance between the push protrusions 134, the user applies an external force to elastically deform the push protrusions 134 outwardly, coupling the tube 200 to the connector 100. The connector 100 may be coupled to the tube 200 in the same way as the tube 200 is coupled connector 100.

According to an exemplary embodiment of the present invention, the user may easily assemble the connector 100 without a separate fastening device. In addition, the tube 200 may be easily assembled to the connector 100 without a separate fastening device. Therefore, the connector 100 according to an exemplary embodiment of the present invention can have improved assemblability.

Also, according to an exemplary embodiment of the present invention, when the connector 100 and the tube 200 are assembled, the coating of the tube 200 is not peeled off, so that the corrosion resistance can be improved.

According to an exemplary embodiment of the present invention, the release sleeve 130 firmly presses the tube 200 and the sealing O-ring 120 inside the connector body 110, improving the performance for preventing oil leakage.

According to an exemplary embodiment of the present invention, the structure of a mold for producing the connector body 110, the sealing O-ring 120, and the release sleeve 130 that form the connector 100 is simplified, so that the manufacturing cost of the mold can be reduced.

In addition, according to an exemplary embodiment of the present invention, the structure of the connector body 110, the sealing O-ring 120, and the release sleeve 130 that form the connector 100 is simple, so that the manufacturing cost of the connector 100 can be reduced.

According to an exemplary embodiment of the present invention, the release sleeve 130 firmly presses the tube 200 and the sealing O-ring 120 against the inside of the connector body 110, so that the coupling force between the tube 200 and the connector 100 can be improved.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A hydraulic tube connector for a vehicle, the hydraulic tube connector comprising:
    a connector body including a first through-hole into which a tube having a tube protrusion extending outward therefrom is configured to be inserted and a sealing O-ring groove which is formed at a first side of the first through-hole and a plurality of coupling holes distanced from each other in a circumferential direction of the connector body;
    a sealing O-ring configured to be coupled to the sealing O-ring groove; and
    a release sleeve coupled to the connector body to prevent the sealing O-ring from being separated from the sealing O-ring groove, wherein the sealing O-ring includes a tube protrusion groove into which the tube protrusion is inserted,
wherein the release sleeve includes:
a push protrusion configured to press the tube protrusion so that the tube protrusion is in contact with the tube protrusion groove,
a press protrusion configured to press the sealing O-ring so that the sealing O-ring is in contact with the sealing O-ring groove, and
a coupling protrusion configured to be engaged with one of the plurality of coupling holes so that the release sleeve is coupled to the connector body, and
wherein the push protrusion is engaged with one of the plurality of coupling holes, and wherein the release sleeve is coupled to the connector body.

2. The hydraulic tube connector according to claim 1, wherein the sealing O-ring includes a second through-hole into which the tube is configured to be inserted.

3. The hydraulic tube connector according to claim 2, wherein the sealing O-ring further includes a step protrusion inserted into the sealing O-ring groove to prevent oil flowing between the tube and the first through-hole from leaking to the outside of the connector body.

4. The hydraulic tube connector according to claim 2, wherein the release sleeve further includes a third through-hole into which the tube is configured to be inserted, and the first through-hole, the second through-hole and the third through-hole are disposed coaxially with each other.

5. The hydraulic tube connector according to claim 1, wherein the press protrusion is extended in an axial direction of the release sleeve.

6. The hydraulic tube connector according to claim 1, wherein the coupling protrusion is extended outward of the press protrusion.

7. The hydraulic tube connector according to claim 1, wherein the release sleeve further includes a flange configured to contact with a rear surface of the connector body to prevent the release sleeve from moving forward of the connector body.

8. The hydraulic tube connector according to claim 1, wherein the connector body further includes an O-ring groove formed along an external circumferential surface of the connector body to be coupled to the O-ring.

9. The hydraulic tube connector according to claim 1, wherein the connector body further includes a plurality of grip portions protruding radially outward of the connector body.

\* \* \* \* \*